(12) United States Patent
Calamera et al.

(10) Patent No.: US 8,205,080 B2
(45) Date of Patent: Jun. 19, 2012

(54) OVER THE AIR COMMUNICATION AUTHENTICATION USING A DEVICE TOKEN

(75) Inventors: Pablo Calamera, San Jose, CA (US); Oscar A. Montemayor, San Jose, CA (US); Henry W. Gebhardt, III, San Francisco, CA (US); Mandar Khadilkar, San Jose, CA (US); Joe Freeman Britt, Jr., Los Gatos, CA (US)

(73) Assignee: Microsoft Corporation, Redmond, WA (US)

( * ) Notice: Subject to any disclaimer, the term of this patent is extended or adjusted under 35 U.S.C. 154(b) by 1005 days.

(21) Appl. No.: 11/801,967

(22) Filed: May 11, 2007

(65) Prior Publication Data
US 2009/0138948 A1 May 28, 2009

(51) Int. Cl.
*H04L 29/06* (2006.01)
(52) U.S. Cl. ............ 713/168; 380/44; 380/270
(58) Field of Classification Search ........... 713/168, 713/172, 173, 178, 184, 185; 726/5, 6, 18, 726/19, 20, 28, 29; 380/44
See application file for complete search history.

(56) References Cited

U.S. PATENT DOCUMENTS

| | | | | |
|---|---|---|---|---|
| 6,065,117 | A * | 5/2000 | White | 713/159 |
| 7,054,657 | B2 * | 5/2006 | Alanara | 455/551 |
| 7,222,363 | B2 | 5/2007 | Rice et al. | |
| 7,478,434 | B1 | 1/2009 | Hinton et al. | |
| 7,675,854 | B2 | 3/2010 | Chen et al. | |
| 2004/0131185 | A1 * | 7/2004 | Kakumer | 380/247 |
| 2004/0187015 | A1 * | 9/2004 | Geer et al. | 713/200 |
| 2006/0274869 | A1 * | 12/2006 | Morse | 375/352 |
| 2007/0192404 | A1 * | 8/2007 | School | 709/203 |
| 2008/0123843 | A1 * | 5/2008 | Machani | 380/44 |

OTHER PUBLICATIONS

"Non-Final Office Action", U.S. Appl. No. 11/801,982, (Sep. 14, 2010),10 pages.
"Final Office Action", U.S. Appl. No. 11/801,982, (Dec. 9, 2010),9 pages.
"Non-Final Office Action", U.S. Appl. No. 11/801,982, (May 19, 2011),11 pages.
"Final Office Action", U.S. Appl. No. 11/801,982, (Oct. 6, 2011),12 pages.

* cited by examiner

*Primary Examiner* — Gilberto Barron, Jr.
*Assistant Examiner* — Izunna Okeke
(74) *Attorney, Agent, or Firm* — Wolfe-SBMC

(57) ABSTRACT

A system and method are described for securing over the air communications between a service and a communication device. For example, one embodiment of a method for creating a security token on a communication device for communication between the communication device and a service includes combining a device identification of the communication device with a device capability to create a device information, the device capability known by the service. The method further includes encrypting the device information.

6 Claims, 8 Drawing Sheets

OVER THE AIR COMMUNICATION AUTHENTICATION USING A DEVICE TOKEN

TECHNICAL FIELD

This application relates generally to the field of data processing systems and more particularly to a secure over the air communications.

BACKGROUND

Various techniques exist for providing secure communication over wireless networks. For example, a data stream may be encrypted at a source node prior to transmission and decrypted at a destination node using different types of encryption technologies.

Many security algorithms, though, require a specific software program to be installed on a wireless device in order for the wireless device to use the algorithm. In addition, many of the algorithms are vulnerable to being hacked. For example, hackers have been known to impersonate a valid wireless device by creating a false International Mobile Equipment Identity {IMEI}, a number unique to every GSM and UMTS mobile phone which is typically found printed on the phone underneath the battery and/or by dialing the sequence *#06# into the wireless device. Another problem with existing algorithms is that updates must be continually downloaded to the wireless device in order to keep protection current.

SUMMARY

A system and method are described for securing over the air ("OTA") communications between a service and a communication device. For example, one embodiment of a method for creating a security token on a communication device for communication between the communication device and a service includes combining a device identification of the communication device with a device capability to create device information, the device capability known by the service. The method further includes encrypting the device information.

BRIEF DESCRIPTION OF THE DRAWINGS

A better understanding of Over the Air Communication Authentication Using a Device Token can be obtained from the following detailed description in conjunction with the following drawings, in which.

DETAILED DESCRIPTION

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of a Data Processing Service

Figure 1:
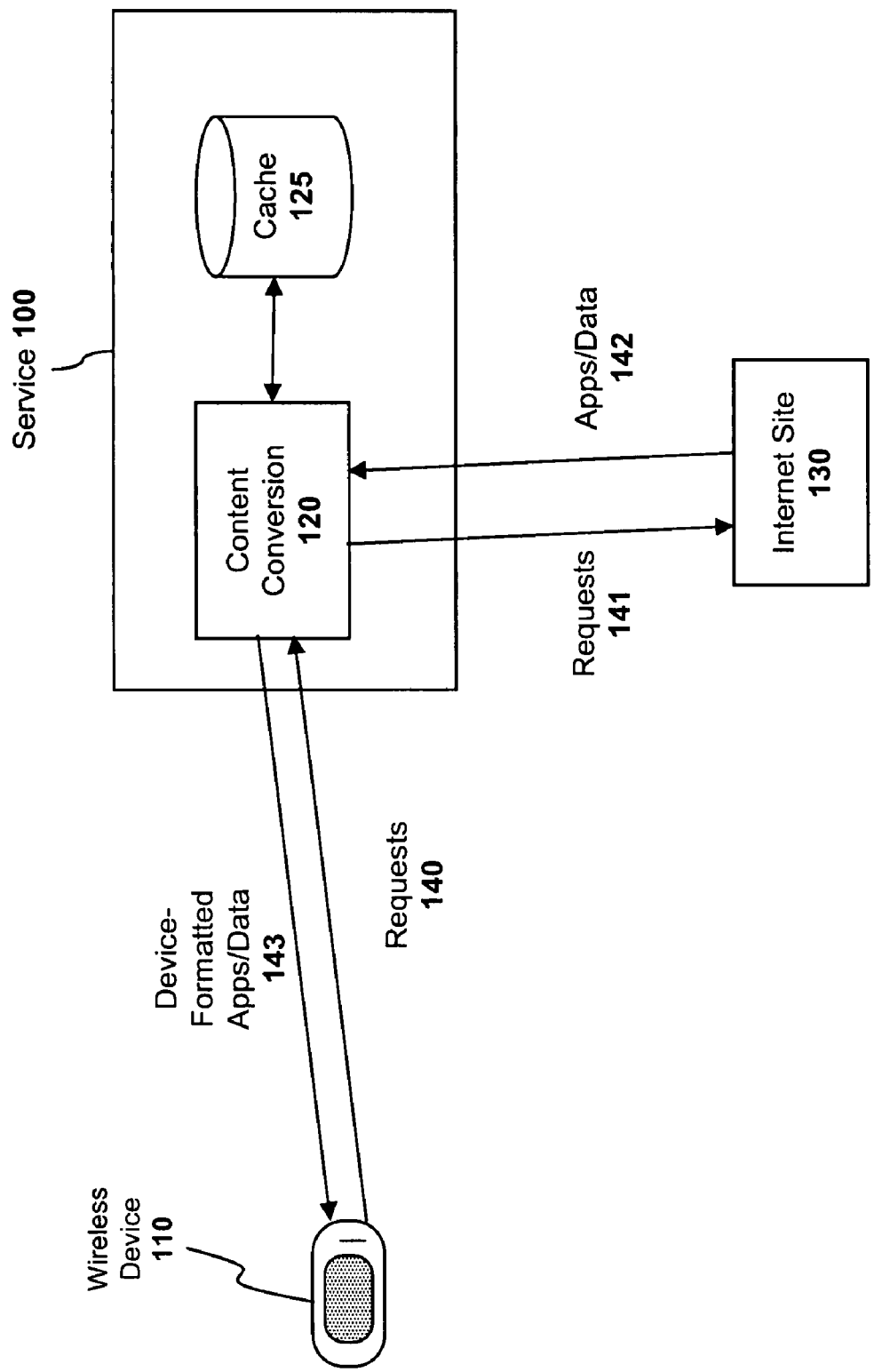
FIG. 1 illustrates a service communicating with a data processing device according to one embodiment of the invention.

Embodiments of the invention may be implemented on a wireless device 110 which communicates with a data processing service 100 as illustrated generally in FIG. 1. Embodiments of a service 100 and data processing device 110 are described, for example, in co-pending application entitled SYSTEM AND METHOD FOR INTEGRATING PERSONAL INFORMATION MANAGEMENT AND MESSAGING APPLICATIONS, Ser. No. 10/262,298, filed Sep. 30, 2002, and embodiments of dynamically managing presence and contact information on a data processing device 110 are described in co-pending application entitled SYSTEM AND METHOD FOR DYNAMICALLY MANAGING PRESENCE AND CONTACT INFORMATION, Ser. No. 10/611,019, filed Jun. 30, 2003 (hereinafter "co-pending applications"), which are assigned to the assignee of the present application and which are incorporated herein by reference.

Certain features of the service 100 will now be described followed by a detailed description of the system and method for secure over the air communications. It should be noted, however, that the specific data processing device and system architecture described in the co-pending applications are not required for implementing the underlying principles of the invention.

In one embodiment, the service 100 converts standard applications and data into a format which each wireless communication device 110 can properly interpret. Thus, as illustrated in FIG. 1, one embodiment of the service 100 includes content conversion logic 120 for processing requests for Internet content 140 from a wireless communication device 110. More particularly, the service 100 acts as a proxy for the data processing device 110, forwarding Internet requests 140, 141 to the appropriate internet site 130 on behalf of the wireless communication device 110, receiving responses from the internet site 130 in a standard format, and converting the responses 124 into a format which the wireless communication device 110 can process (e.g., bytecodes).

For example, the conversion logic 120 may include a rendering module (not shown) for interpreting HTML code and translating that code into a format capable of being processed/rendered on the wireless communication device 110. As described in the prior applications, in one embodiment, the device-specific format comprises bytecodes/applets which, in one embodiment, are a form of Java bytecodes/applets. However, the conversion logic 120 may generate various other types of interpreted and/or non-interpreted code, depending on the particular type of wireless communication device 110 being used (e.g., one with an interpreter module or one without).

Because one embodiment of the service 100 maintains an intimate knowledge of the capabilities/configuration of each data processing device 110 (e.g., screen size, graphics/audio capabilities, available memory, processing power, user preferences, . . . etc) it can reconstruct the requested data accurately, while at the same time minimizing the bandwidth required to transmit the content to the device 110. For example, the conversion logic 120 may perform pre-scaling and color depth adjustments to the requested content so that it will be rendered properly within the data processing device's 110's display. In making these calculations, the conversion may factor in the memory and processing power available on the data processing device 110. In addition, the conversion logic 120 may compress the requested content using a variety of compression techniques, and thereby preserve network bandwidth.

Secure Over the Air Communications

Figure 2:
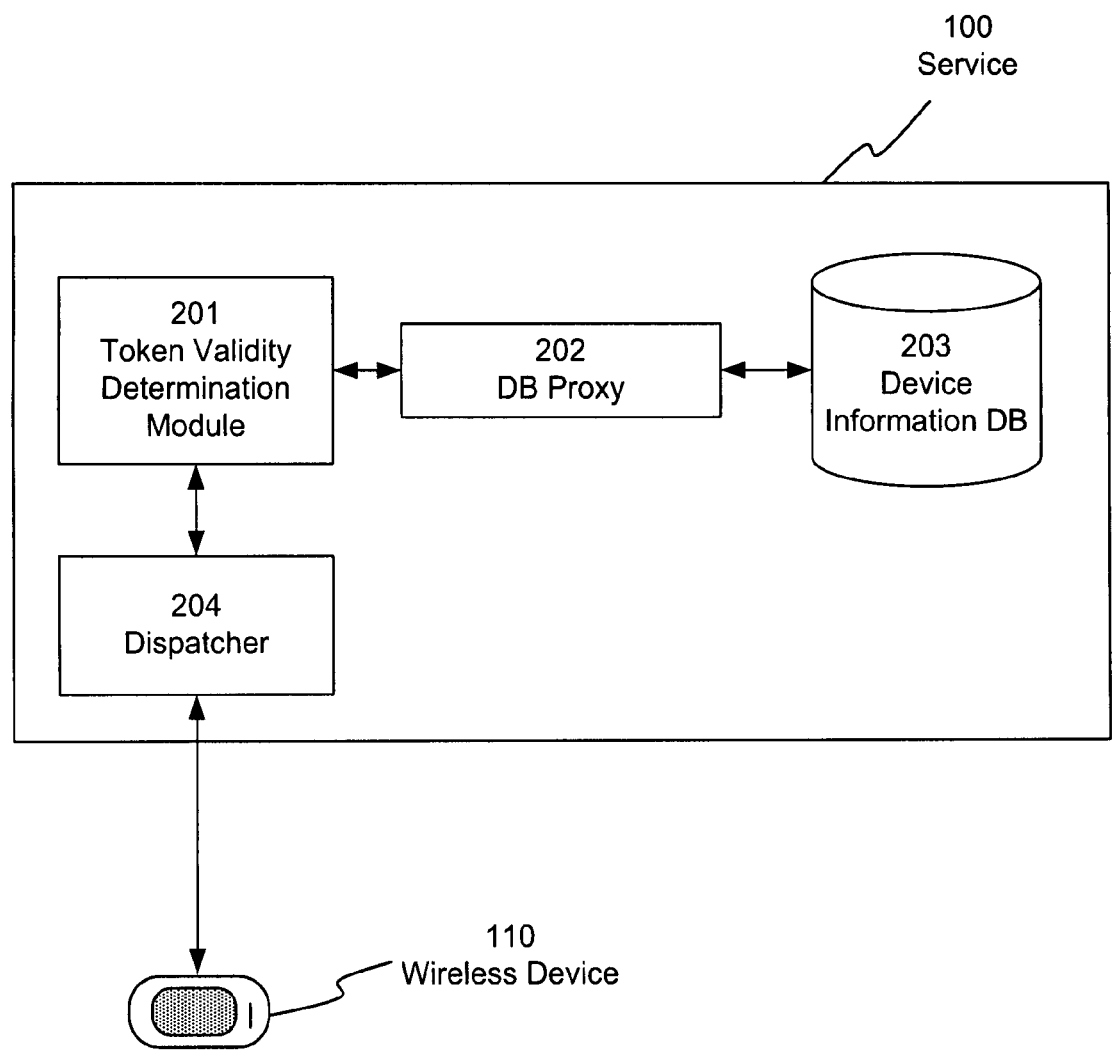
FIG. 2 illustrates one embodiment of a service of FIG. 1 for determining the validity of a Device OTA token.

FIG. 2 illustrates one embodiment of the service 100 used for secure over the air communication with a wireless communication device 110. The service 100 generally includes a token validity determination module 201; a device information DB 203; a database proxy (DB proxy) 202 for sending/retrieving device information to/from the device information database (DB) 203; and a dispatcher 204.

In one embodiment, when a user wishes to communicate with the service 100 or when the service 100 needs to transmit sensitive information to the wireless device 110, a token (sometimes referred to herein as "OTA token") is transmitted between the wireless communication device 110 and the service 100. When information needs to be sent from the service 100 to the wireless communication device 110, the device 110 creates and sends the OTA token to the service 110 in order for the service 100 to authenticate the device 110. When the device 110 needs to send information to the service 100, the device 110 either precedes the information with a Device OTA Token and/or the device 110 embeds the token into the information being sent from the device 110 to the service 100.

In one embodiment, the information is embedded in a hyper text transfer protocol (HTTP) format between the device 110 and the token validity determination module 201. To process the HTTP format, the validity determination module 201 of this embodiment includes (or is communicatively coupled to) an HTTP server. The token is placed either in an HTTP header (a custom HTTP header or preexisting HTTP header) or in a predetermined position of the HTTP body.

Device OTA Token Generation and Checking

Figure 3:
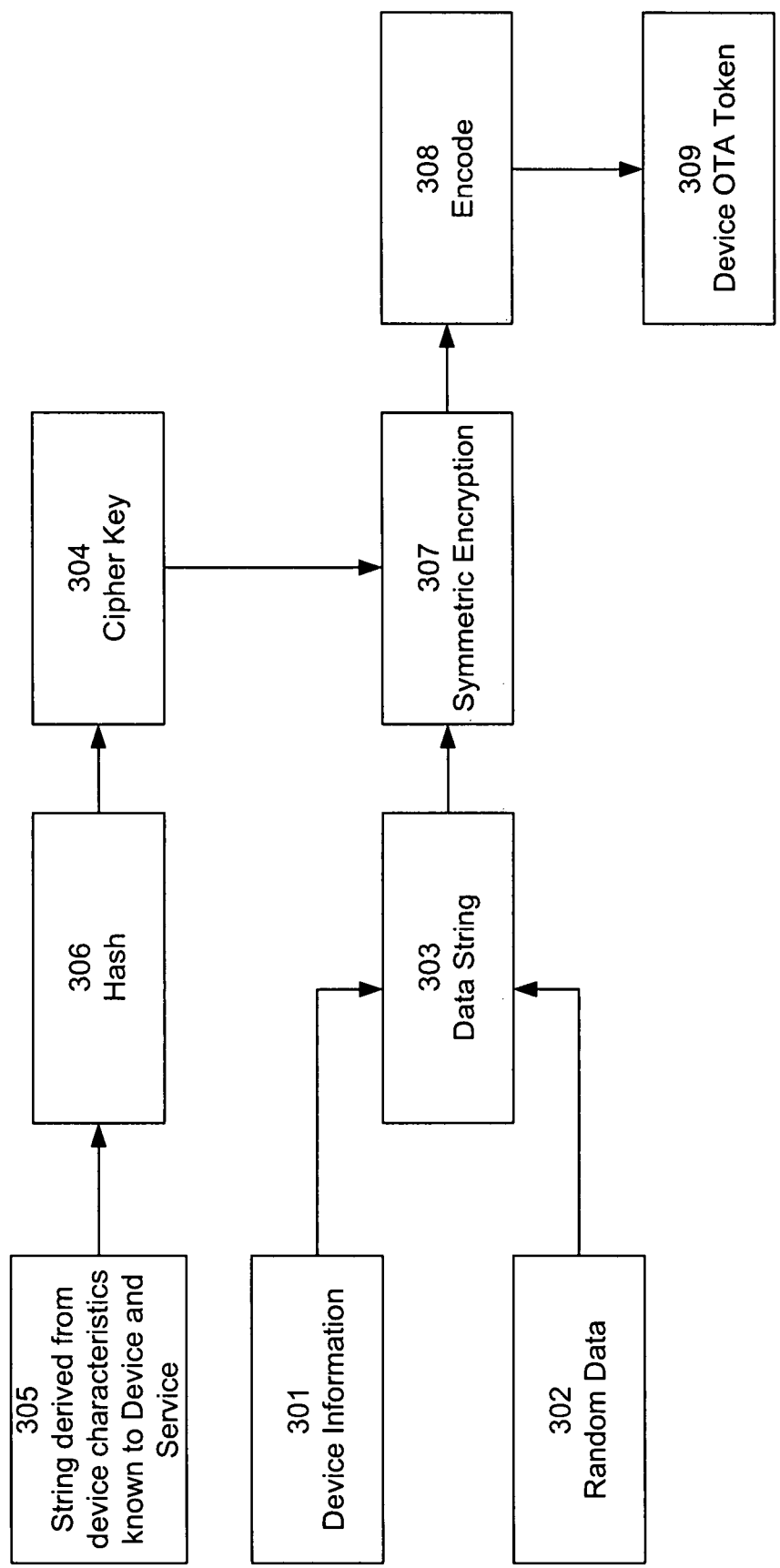
FIG. 3 illustrates one embodiment of creating a Device OTA token.
Figure 4:
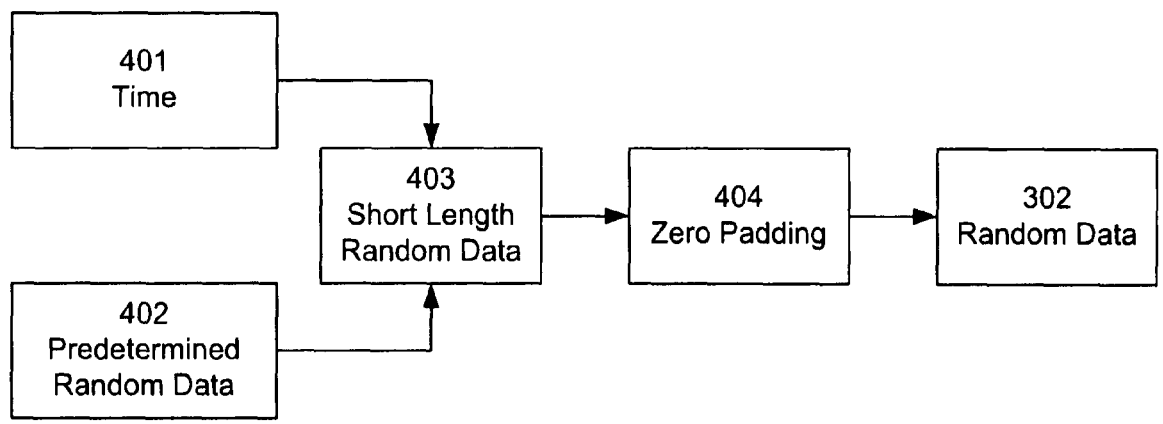
FIG. 4 illustrates one embodiment of creating random data used to create the Device OTA token in FIG. 3.
Figure 5:
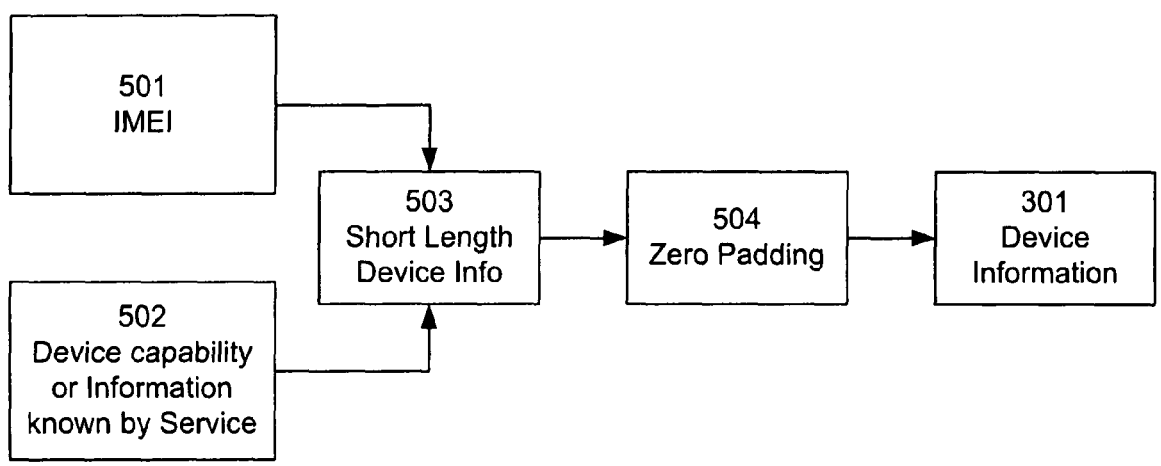
FIG. 5 illustrates one embodiment of creating device information used to create the Device OTA token in FIG. 3.

FIGS. 3-5 illustrate one embodiment of creating a Device OTA token. Referring to FIG. 3, device information 301 is combined with random data 302 to create a data string 303. "Combining," as described, may include XORing, ANDing, concatenation, or any other common way to merge multiple pieces of data together.

FIG. 4 illustrates one embodiment of the random data 302. A time stamp 401 pulled from the internal clock of the wireless communication device 110 is combined with predetermined random data 402 known by the service 100 to create the short length random data 403. The short length random data is the random data 302 at an incorrect bit length needed by the device 110. For example, 512 bits may be needed for the random data 302, but the short length random data 403 is 128 bits. Therefore, the short length random data 403 is zero padded (404) in order to create random data 302.

FIG. 5 illustrates one embodiment of the device information 301. The IMEI 501 and a device capability or information 502 known by the service 100 is combined to create a short-length device information 503. Device capabilities 502 are capabilities or other device information/configurations stored in the device information DB 203 of the service 100. Exemplary device capabilities 502 may include: International Mobile Equipment Identity (IMEI), International Mobile Subscriber Identity (IMSI), version number of the operating system, version number of the firmware, user id, Integrated Circuit Card Identifier (ICC ID), Bluetooth ID, Mobile Station International Subscriber Directory Number (MSISDN) (the device's phone number), version of the recovery ROM (also used to differentiate between different hardware versions of the device), version number of the software library, label of the software build configuration, etc. The short length device information 503 illustrated in FIG. 5 is a shortened version of the device information 301 illustrated in FIG. 3. Therefore, the short length device information 503 is zero padded at 504 to create device information 301.

Referring back to FIG. 3, the data string 303 is encrypted at 307. Types of encryption that can be used to encrypt the stream of data strings or blocks 303 include but are not limited to: OFB, CCM, CBC, CFB, ECB, EAX, GCM, OCB, or any symmetric encryption algorithm. A cipher key 304 (initialization vector) is used to make the signature of the encrypted data unique and the encrypted data decryptable. In one embodiment, the cipher key 304 is created from device characteristics known to the device 110 and the service 100 by performing a hash 306 on a string of the device characteristics.

The characteristics include, but are not limited to: International Mobile Equipment Identity (IMEI), International Mobile Subscriber Identity (IMSI), version number of the operating system, version number of the firmware, user id, Integrated Circuit Card Identifier (ICC ID), Bluetooth ID, Mobile Station International Subscriber Directory Number (MSISDN) (the device's phone number), IP number, version of the recovery ROM (also used to differentiate between different hardware versions of the device), version number of the software library, and label of the software build configuration. Multiple characteristics may be combined through addition, multiplexing, and/or concatenating. The characteristics may be inversed for combining, too. For example, a Bluetooth ID may be concatenated with the reverse Bluetooth ID. Hashes that may be used for hash 306 include, but are not limited to: SHA1, 256, Merkle-Damgard hash, block cipher hashes, MD2, MD5, Haval, and Whirlpool.

Once the data strings 303 are encrypted 307, the encrypted data is encoded 308 to create the Device OTA token 309. Types of encoding that may be used include, but are not limited to: base128, base64, base32, base16, base8, or any other encoding technique to transform the data from one format to another.

In one embodiment, each step of creating the Device OTA token 309 illustrated in FIGS. 3-5 is performed by a dedicated hardware module. In another embodiment, illustrated in FIG. 6, the Device OTA token 309 is created by a Java® application 601 on the device 110. There are several advantages to using a software program, such as a Java or other object oriented program, to create the Device OTA token 309. For example, the program is easy to update and disassemble. Furthermore, most to all of the computations in creating the Device OTA token 309 are in existing function calls of the Operating System (OS) 602 of the wireless communication device 110.

Thus, a computer program is only necessary to organize the sequence of function calls from the OS in order to create the Device OTA token 309.

Figure 6:
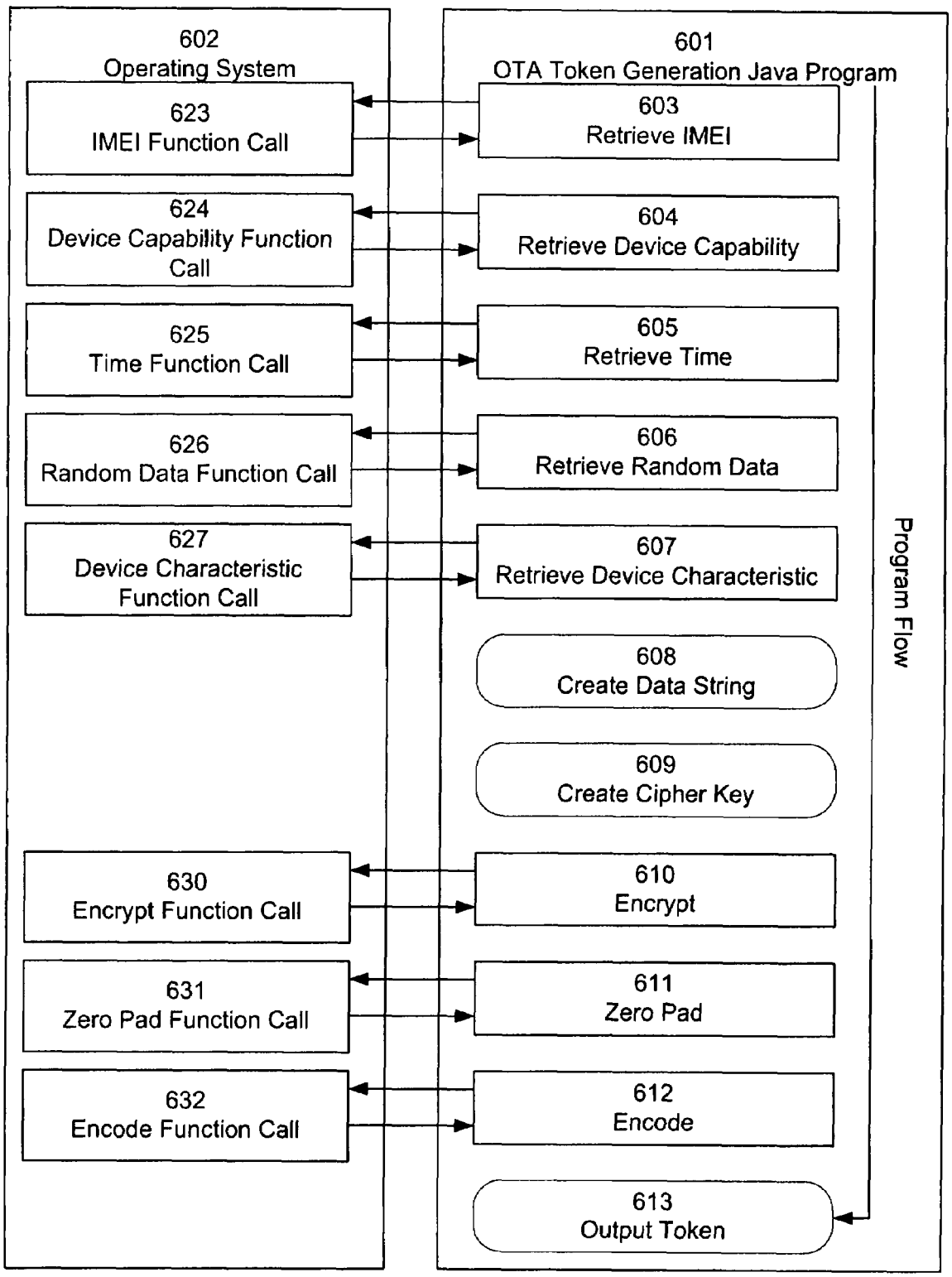
FIG. 6 illustrates one embodiment of a program for creating a Device OTA token and the operating system located on the wireless communication device of FIG. 2.

Referring to FIG. 6, the computer program 601 accesses the Operating System (OS) 602 for an IMEI Function Call 623 to retrieve the IMEI 603, a Device Capability Function Call 624 to retrieve device capability 604, a Time Function Call 625 to retrieve the time 605 from the internal clock of the device 110, and a Random Data Function Call 626 to retrieve a pseudorandom code 606 that can be recreated by the service 100. The data obtained by the program 601 from the calls 623-626 is used by the program 601 to locally create the data string 608. The program 601 accesses the OS 602 also for a device characteristic function call in order to obtain the device characteristic 607. The device characteristic is then used by the program 601 to create a cipher key through a hash 609. The program 601 also encrypts 610 and encodes 612 the data strings using the cipher key through an Encrypt Function Call 630 and an Encode Function Call 632 to the OS 602. Zero Padding is also performed anywhere during the creation of the token by the program 601 through a Zero Pad Function Call 631. In the illustrated embodiment, the function calls are preexisting in the OS 602. In another embodiment, creating the data string and creating a cipher key is performed through preexisting function calls to the OS 602. The program 601 is then able to output the token 613 as necessary (e.g., embedding the token into the body of HTTP data to be sent to the service 100).

Figure 7:
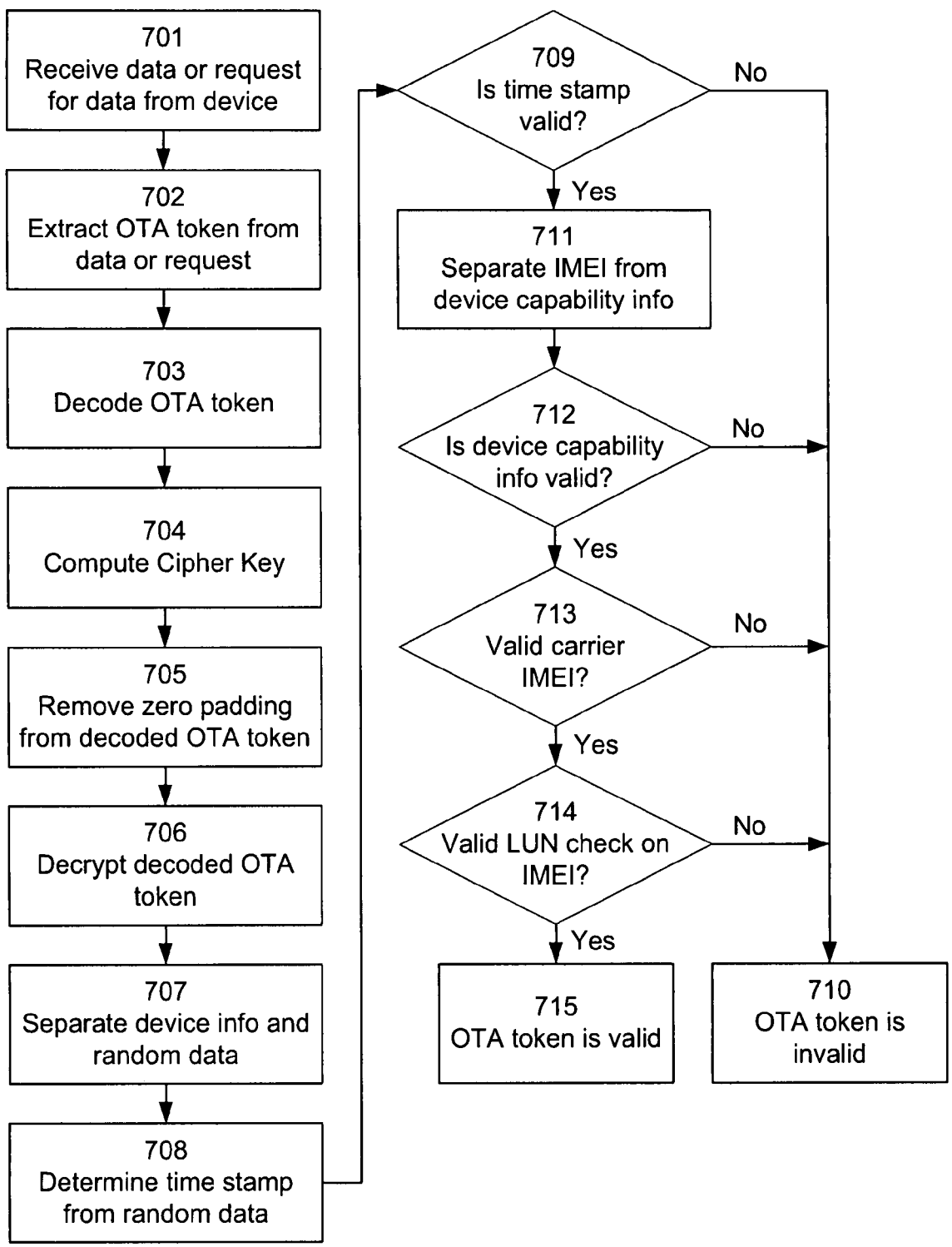
FIG. 7 illustrates an example flow for the service of FIG. 2 to determine if a received Device OTA token is valid.

FIG. 7 illustrates one embodiment of a method for checking the validity of the device OTA token and thus the authenticity of the connected device 110. In 701, the token validity determination module 201 of the service 100 receives data or a request for data from the wireless communication device 110 via the dispatcher 204. Upon receiving data or a request from a wireless communication device 110, the token validity determination module 201 knows the predefined location of the device OTA token 309. For example, the token validity determination module 201 knows where in the HTTP body or header the token 309 was embedded. Proceeding to 702, the token validity determination module 201 extracts the device OTA token. Once the device OTA token is extracted, the token validity determination module 201 begins deconstructing the token. At 703, the token validity determination module 201 decodes the device OTA token into the zero padded encrypted data string computed by the device 110. At 704, the token validity determination module 201 computes the cipher key for the zero padded encrypted data string in order to decrypt the data. As previously described, the device characteristic of the device is used to create a cipher key. The token validity determination module 201 knows the device characteristic for device 110 from the communication including the token between the wireless communication device 110 and the service 100. Therefore, the token validity determination module 201 performs a hash on the bit string of the modified device characteristic string.

Proceeding to 705, the token validity determination module 201 strips the zero padding from the decoded OTA token. The token validity determination module 201 knows the exact process the wireless communication device 110 follows in creating the OTA token and thus knows how many and where zeros were included. Once the zero padding is removed, the token validity determination module 201 decrypts the decoded OTA token using the recreated cipher key (706) to recreate the data string 303 (see FIG. 3). Proceeding to 707, the token validity determination module 201 separates the device information 301 from the random data 302 of the data string 303. The token validity determination module 201 may then extract a time stamp from the random data 302. In order to separate the time, the token validity determination module 201 recreates and removes the predetermined random data 402 (see FIG. 4) from the random data 302. In one embodiment, the token validity determination module 201 includes a pseudorandom number generator that is exactly the same as the one on the device and performs a predetermined number of iterations of computing a number with the generator in order to create the predetermined random number 402.

Proceeding to 709, the token validity determination module 201 determines if the time 401 is valid. The service 100 may not know precisely when the OTA token 309 was created. Therefore, in one embodiment, the token validity determination module 201 sets a range of valid times in which the time 401 must exist. For example, the token validity determination module 201 assumes that a Device OTA Token must be created within the past five minutes in order to be valid. Hence, if the device OTA token is not within five minutes of the present time, then the token validity determination module 201 determines that the time is invalid. If the token validity determination module 201 determines that the time is invalid, the token validity determination module 201 determines that the device OTA token 309 is invalid at 710. If the token validity determination module 201 determines that the time is valid, the process flows to 711.

At 711, the token validity determination module 201 separates the device capability information 502 and the IMEI 501. Proceeding to 712, the token validity determination module 201 determines the validity of the device capability information 502. The token validity determination module 201 retrieves the device information from the device information DB 203 via the DB proxy 202. The token validity determination module 201 then uses the retrieved information to check the validity of the device capability 502. If inconsistencies exist, the token validity determination module 201 determines that the OTA token is invalid at 710. If the token validity determination module 201 determines that the device capability 502 is valid, then the process flows to 713.

At 713, the token validity determination module 201 determines if the IMEI 501 is within a valid range for the carrier of the wireless communication device 110. Wireless carriers, such as Sprint® and Cingular®, each have a separate range of IMEI's which are known by the token validity determination module 201. The token validity determination module 201 also knows the carrier for the wireless communication device 110 that sent the device OTA token. Therefore, the token validity determination module 201 retrieves the carrier information for the device 110 and the valid IMEI range for the carrier from the device information DB 203 via the DB proxy 202. The token validity determination module 201 then compares the IMEI 501 from the device OTA token to the valid IMEI range to determine if the IMEI 501 is outside of the valid range. If the IMEI 501 is outside the range, the token validity determination module 201 determines that the device OTA token is invalid at 710. If the token validity determination module 201 determines that the IMEI 501 is within the range of IMEI's for the carrier, then process flows to 714.

At 714, the token validity determination module 201 performs a Luhn check/test on the IMEI 501. An IMEI is of such a nature so as to allow a Luhn check to be performed to check for validity of the IMEI. Outsiders trying to fake the IMEI will not know the length or position of the Luhn check being performed. If the Luhn check on the IMEI 501 fails, then the token validity determination module 201 determines that the device OTA token is invalid at 710. If the Luhn check is successful, then the token validity determination module 201 determines that the device OTA token is valid in 715.

If a service OTA token is not used, once the token validity determination module 201 validates the device OTA token, the service 100 determines that the wireless communication device 110 is authentic. As a result, the service 100 accepts the information transferred from the wireless communication device 110 to the service 100 or prepares the requested information or transfer to the wireless communication device 110.

Service OTA Token Generation and Checking

Figure 8:
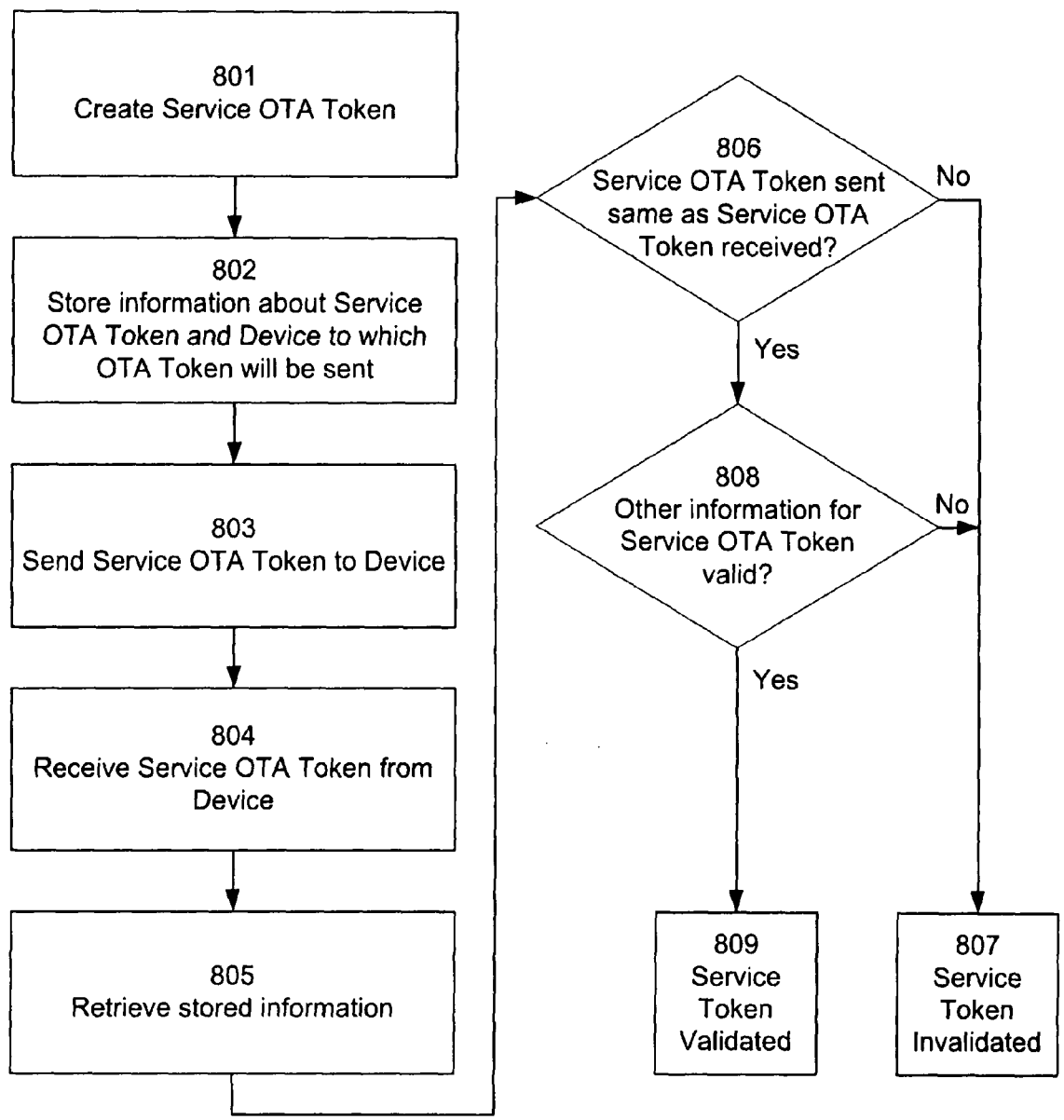
FIG. 8 illustrates an example flow of sending to, receiving from, and checking a Service OTA Token the Device by the Service of FIG. 1.

FIG. 8 illustrates an example flow of generating, transmitting/receiving, and checking a service OTA token. A service OTA token is a token generated by the service 100 that is sent to the device 100 and then later sent back and received from the device 100. Receiving the service OTA token from the device 100 helps insure that the device 110 is the intended and valid device for communication with the service 100.

Beginning at 801, the service 100 generates a service OTA token. In one embodiment, the service OTA token is a unique identifier from a collection of information about the OTA and information about the device 110 to receive the OTA. The information about the device 110 is known by both the service 100 and the device 110. Example information of the OTA includes, but not limited to, build number, release date, release version, author, or any other information that may be pulled from the OTA. Example information about the device 110 includes, but is not limited to: International Mobile Equipment Identity (IMEI), International Mobile Subscriber Identity (IMSI), version number of the operating system, version number of the firmware, user id, Integrated Circuit Card Identifier (ICC ID), Bluetooth ID, Mobile Station International Subscriber Directory Number (MSISDN) (the device's phone number), IP number, version of the recovery ROM (also used to differentiate between different hardware versions of the device), version number of the software library, label of the software build configuration, SIM ID, and SIM ID type.

Proceeding to 802, the service 100 stores information about the Service OTA Token and Device 110 to which the Service OTA Token is to be sent. Information that may be stored includes: Creation Time of the Service OTA token, the device OTA token (e.g., hashkey, Row ID, encrypted string or other unique identifier), user ID for the device 110 to receive the token, device ID, SIM ID, SIM ID type, or any other information about the device 110 and/or the OTA. The stored information is later used to validate a received service OTA token from the device 110. In one embodiment, the entries are indexed in the DB 203 by the device 110 to which the specific service OTA token is to be sent.

Once the information is stored, the service OTA token is sent to the device 110. In a later communication from the device 110 to the service 100, the service OTA token is received by the service 100. The service 100 then checks the validity of the token and the information about the communication to validate the token. To do so, the service 110 retrieves the stored information from the DB 203 in 805. In one embodiment, the service 100 determines which device 110 sent the token and queries the DB 203 for the correct entry corresponding to the device 110. Proceeding to 806, the service 100 determines whether the service OTA token received from device 110 is the same as the service OTA token sent to device 110. If the tokens do not match, then the service token is invalidated in 807 and secure communication with the device does not continue.

If the sent and received tokens match in 806, then the service 100 determines if other information sent from the device 110 to the service 100 is valid in 808. For example, the service 100 determines if the present time and the time the service OTA token was created is within a predefined amount of time (e.g., the token was created and received by the service within five minutes). In another example, the service 100 determines if the service OTA token is sent and received during the same communication session with the device 110 (e.g., the service 100 compares the session id when transmitting the token with the session id when receiving the token). If the information is not valid (e.g., too much time lapsed or the service OTA token is received during a different session than when sent), then the service token is invalidated and secure communication with the device 100 does not continue (807). If the information is valid in 808, then the service OTA token is validated. If no device OTA token is used, then the service 100 proceeds with secure communication with the device 110, such as OTA updates of the device.

Service and Device OTA Tokens Generation and Checking

Figure 9:
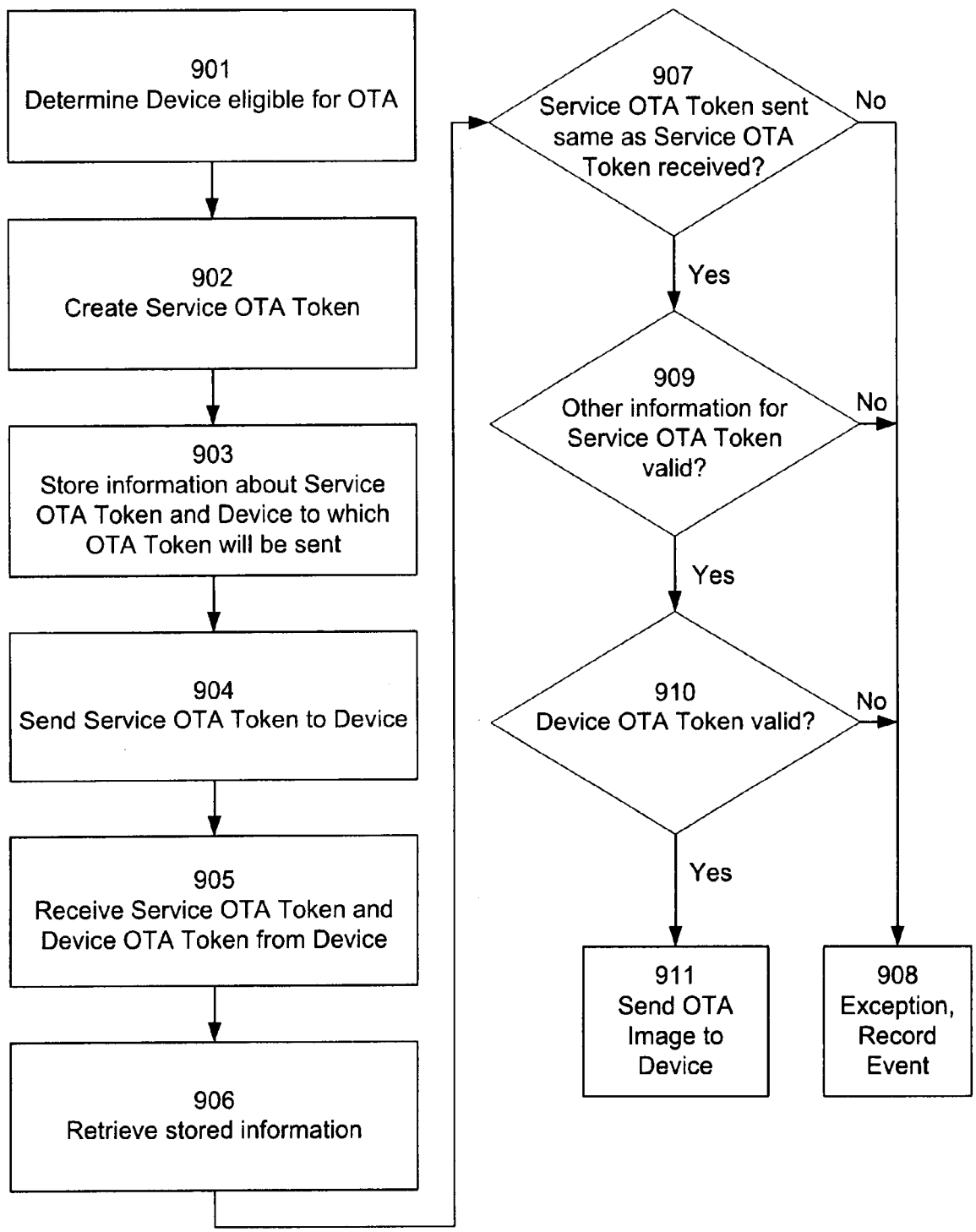
FIG. 9 illustrates an example flow of the Service of FIG. 1 combining the use of a Service OTA Token and a Device OTA Token.

FIG. 9 illustrates one embodiment of combining a service OTA token and device OTA token to secure OTA communications between device 110 and service 100. In 901, the service 100 determines a device 110 connected to the service 100 eligible for OTA communication with the service 100 (e.g., a critical update to the software on device 110). Once the device 110 is determined, the service 100 creates the service OTA token in 902. Once the token is created, process flows to 903 where the service 100 stores information about the service OTA token and the device to which the service OTA token is to be sent (as previously described). Proceeding to 904, the service 100 sends the service OTA token to the device 110. During some part of this time, the device 110 creates a device OTA token to be sent to the service 100. Therefore, in 905, the service 100 receives both the service OTA token and the device OTA token from the device 110. Upon receiving the tokens, the service 100 retrieves the stored information from DB 203 to check the validity of the tokens and communication session (906). Proceeding to 907, the service determines if the service OTA token sent to device 110 is the same as the service OTA token received from device 110. If the token received is not the same as the token sent, the an exception is recorded and secure OTA communications between the service 100 and device 110 is halted (908).

If the token received is the same as the token sent in 907, then process flows to 909. In 909, the service 100 determines whether other information sent with the service OTA token from the device 110 to the service 100 is valid (as previously described; e.g., time lapsed between creating and receiving the token, sending and receiving is done during the same communication session). If the information is not valid, then process flows to 908. If the information is valid, then process flows to 910. In 910, the service 100 determines if the device OTA token is valid (as previously described). If the device OTA token is not valid, then process flows to 908. If the device OTA token is valid, then process flows to 911. In 911, the service 100 authenticates the communication session with the device 110 and begins secure communications with the device 110. For example, the service 100 may send an OTA image to the device 110 in order to update the software and/or firmware on the device 110.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, aspects of the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, multi-purpose telephony/data processing devices are particularly suitable for implementing certain aspects of the invention because these devices can initiate communication over a variety of communication channels (e.g., voice, IM, email, SMS, MMS, etc). However, the underlying principles are not limited to these types of devices. For example, the underlying principles of the invention may be implemented within standard personal computer configurations standard wireless telephones, and/or other types of communication devices (e.g., vehicle communication devices). Moreover, although the invention was described in the context of specific types of protocols (e.g., HTTP), the underlying principles of the invention are not limited to any particular type of protocol or information format.

In fact, while the device information was described as including the IMEI and device capabilities of the device, the device information may consist solely of the IMEI. In addition, while padding the length of a string was described in terms of zero padding, other types of padding may be used, including a random padding repeatable by the service. Furthermore, while padding was described in creating random data and device information, padding may be used anywhere or excluded in the OTA token creation process as necessary. In another example, while IMEI's were described in creating and checking the validity of a Device OTA Token, other unique device identifications may also be used (e.g., device identifiers for devices on UMTS networks or a serial number of the device). Therefore, the scope of the claims should not be limited to the use of IMEI's.

Various features of the invention may be implanted in software, firmware, hardware, and/or any combination of the three. Therefore, the term "module" should be interpreted as meaning any or the combination of software, firmware, and/or hardware and thus not limited to one specific interpretation.

Accordingly, the scope and spirit of the invention should be judged in terms of the claims which follow.

What is claimed is:

1. A method comprising:
    combining a timestamp from an internal clock of a communication device with predetermined random data known by a service to create random data:
    combining a device identification of the communication device with at least one device capability of the communication device to create device information, the at least one device capability known by the service and stored in a device information database of the service, and the at least one device capability comprising at least one of a screen size of the communication device, a graphics capability of the communication device, an audio capability of the communication device, available memory of the communication device, processing power of the communication device, or a user preference of the communication device;
    combining the device information with the random data to create a data string;
    creating a cipher key from characteristics of the communication device by performing a hash on a string of the characteristics, the characteristics known by the communication device and the service, and the characteristics including one or more of an international mobile equipment identity (IMEI), an international mobile subscriber identity (IMSI), a version number of an operating system of the communication device, a version number of firmware of the communication device, a user identifier, an integrated circuit card identifier (ICC ID), a Bluetooth identifier, a mobile station international subscriber directory number (MSISDN), an IP number, a version of a recovery ROM, a version number of a software library, or a label of a software build configuration;
    encrypting the data string with the cipher key; and
    encoding the encrypted data string to create a device token.

2. The method of claim 1, wherein the encrypting comprises symmetrically encrypting the data string with the cipher key.

3. A communication device configured to communicate with a service, the communication device comprising:
    a processor; and
    computer-readable storage media having stored thereon computer-executable instructions that, when executed by the processor, perform a method comprising:
        combining a timestamp from an internal clock of the communication device with predetermined random data known by the service to create random data;
        combining at least one device identification of the communication device with at least one device capability of the communication device to create device information, the at least one device capability known by the service and stored in a device information database of the service, and the at least one device capability comprising at least one of a screen size of the communication device, a graphics capability of the communication device, an audio capability of the communication device, available memory of the communication device, processing power of the communication device, or a user preference of the communication device;
        combining the device information with the random data to create a data string;
        creating a cipher key from characteristics of the communication device by performing a hash on a string of the characteristics, the characteristics known by the communication device and the service, and the characteristics including one or more of an international mobile equipment identity (IMEI), an international mobile subscriber identity (IMSI), a version number of an operating system of the communication device, a version number of firmware of the communication device, a user identifier, an integrated circuit card identifier (ICC ID), a Bluetooth identifier, a mobile station international subscriber directory number (MSISDN), an IP number, a version of a recovery ROM, a version number of a software library, or a label of a software build configuration;

encrypting the data string with the cipher key; and encoding the encrypted data string to create a device token.

4. The communication device of claim 3, wherein the encrypting comprises symmetrically encrypting the data string with the cipher key.

5. Machine-readable storage media, the machine-readable storage media excluding propagation media, having stored thereon computer-executable instructions that, when executed by a processor, perform a method comprising:

combining a timestamp from an internal clock of a communication device with predetermined random data known by a service to create random data;

combining a device identification of the communication device with a device capability of the communication device to create device information, the device capability known by the service and stored in a device information database of the service, and the device capability comprising at least one of a screen size of the communication device, a graphics capability of the communication device, an audio capability of the communication device, available memory of the communication device, processing power of the communication device, or a user preference of the communication device;

combining the device information with the random data to create a data string;

creating a cipher key from characteristics of the communication device by performing a hash on a string of the characteristics, the characteristics known by the communication device and the service, and the characteristics including one or more of an international mobile equipment identity (IMEI), an international mobile subscriber identity (IMSI), a version number of an operating system of the communication device, a version number of firmware of the communication device, a user identifier, an integrated circuit card identifier (ICC ID), a Bluetooth identifier, a mobile station international subscriber directory number (MSISDN), an IP number, a version of a recovery ROM, a version number of a software library, or a label of a software build configuration;

encrypting the data string with the cipher key; and encoding the encrypted data string to create a device token.

6. The machine-readable storage media of claim 5, wherein the encrypting comprises symmetrically encrypting the data string with the cipher key.

* * * * *